April 23, 1968 H. M. FORRESTER 3,380,001
TIME DELAYED BLOCKING OSCILLATOR
Filed Oct. 31, 1966
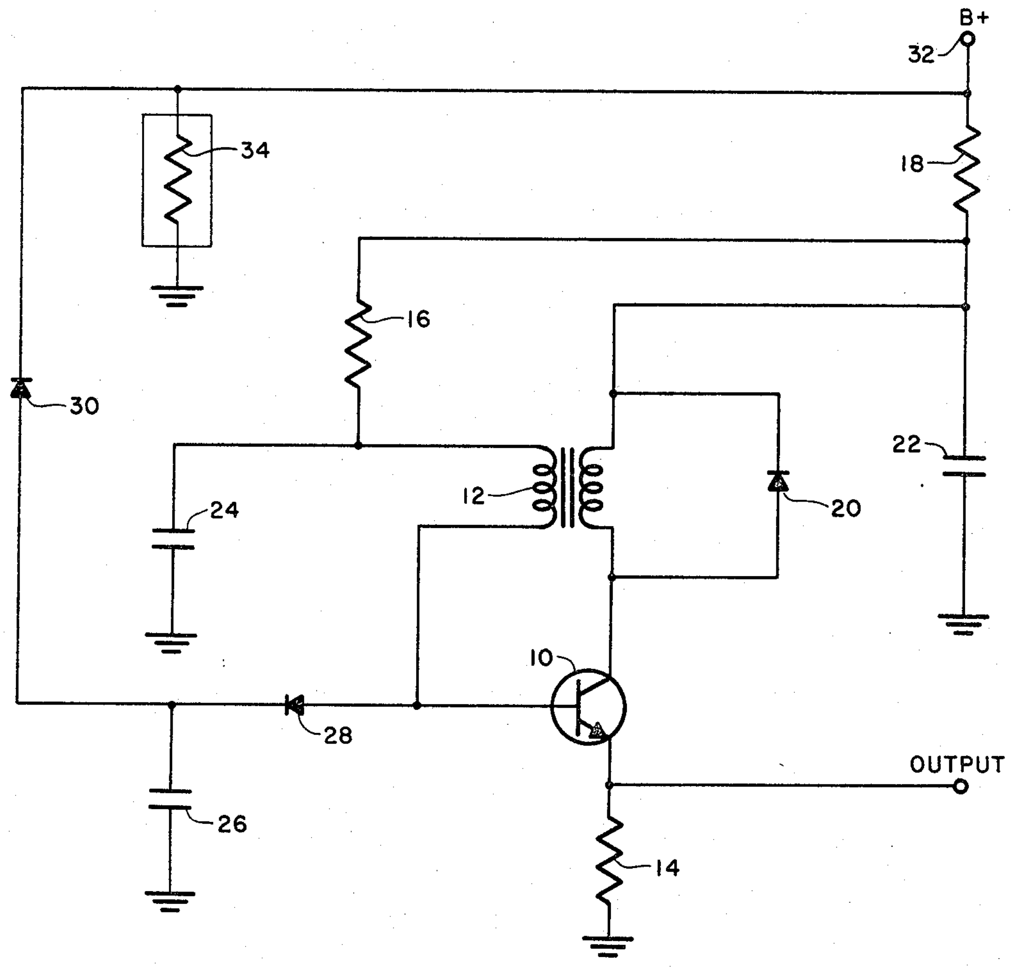
HOWARD M. FORRESTER
INVENTOR.
BY [signature]
[signature]
ATTORNEYS United States Patent Office 3,380,001

Patented Apr. 23, 1968

3,380,001

TIME DELAYED BLOCKING OSCILLATOR

Howard M. Forrester, Corona, Calif., assignor to the United States of America as represented by the Secretary of the Navy Filed Oct. 31, 1966, Ser. No. 591,384
1 Claim. (Cl. 331—112)

ABSTRACT OF THE DISCLOSURE

A circuit for delaying the start of oscillations of a blocking oscillator to permit associated circuitry to stabilize after the application of power by delaying the rise of voltage on the base of the oscillator transistor.

The invention herein described may be manufactured and used by or for the Government of the United States of America for governmental purposes without the payment of any royalties thereon or therefor.

The present invention relates to blocking oscillators and more particularly to blocking oscillators provided with a predetermined time delay of operation after power is applied.

In the art of guided missile fuzing, difficulties have been experienced by premature firing of the warhead resulting from transients which occur before the various circuits stabilize. These transient signals have been processed by the fuzing circuitry as target signals and have ignited the warheads prematnrely. Various means such as electromechanical relays and silicon controlled rectifiers have been utilized to prevent the operation of a blocking oscillator for a sufficient time to permit stabilization of circuit components, but all suffer from the disadvantages of being complicated and requiring several precision components. The present invention requires two diodes and one capacitor which cooperate together to provide a blocking oscillator which is inhibited from oscillating until a predetermined time interval. Accordingly, an object of the invention is to provide a blocking oscillator which is inhibited from oscillating for a predetermined time interval after the power has been applied.

Other objects and many of the attendant advantages of this invention will become readily appreciated as the same becomes better understood by reference to the following detailed description when considered in connection with the accompanying drawing wherein:

There is shown in the single figure a preferred embodiment of the invention.

Referring now to the drawing there is illustrated NPN transistor 10, transformer 12, resistors 14, 16, and 18, diode 20, and capacitors 22 and 24 which combine to form a blocking oscillator. Capacitor 26 is connected in series with diode 28 to the base of transistor 10 and in series with diode 30 to supply voltage source terminal 32.

In operation, as voltage is applied at terminal 32, current flows through resistor 16 charging capacitor 24. When the voltage on capacitor 24 reaches approximately 0.4 volt, diode 28 conducts placing capacitor 26 in parallel with capacitor 24. This delays the rise of voltage on the base of transistor 10 which prevents circuit oscillation. As the base voltage of transistor 10 increases, oscillations gradually start with capacitor 26 charging through diode 28 until it is charged to the peak value of pulses present at the base of transistor 10. When capacitor 26 is charged to this peak value, there is no longer a potential difference between the cathode and anode of diode 28, which causes it to stop conducting and effectively removes capacitor 26 from the blocking oscillator circuit which then continues to operate in the normal manner.

When the supply voltage is removed at terminal 32, capacitor 26 is still charged to the normal peak base potential of transistor 10 and will be discharged through diode 30 and other circuit components represented by resistor 34. With capacitor 26 discharged, re-application of voltage at terminal 32 will result in the desired delay of oscillation as described above.

By way of example, to provide a delay of two seconds, the following components and values have been found satisfactory:

| | | |
|---|---|---|
| Transistor **10** | | 2N697 |
| Transformer **12** | | PCA–TT–101–1 |
| Resistors **14** | | 240Ω |
| Resistors **16** | | 150KΩ |
| Resistors **18** | | 430Ω |
| Diodes **20**, **28**, and **30** | | 1N645 |
| Capacitor **22** | μf | 1 |
| Capacitor **24** | μf | 0.1 |
| Capacitor **26** | μf | 0.47 |
| B+ voltage, DC | | +20 |

Obviously many modifications and variations of the present invention are possible in the light of the above teachings. It is therefore to be understood that within the scope of the appended claims the invention may be practiced otherwise than as specifically described.

What is claimed is:

1. A time delayed blocking oscillator for permitting related circuit components to stabilize after supply voltage is applied, the combination comprising:

(a) a transistor having an emitter, collector, and base, (b) a transformer having a primary winding and a secondary winding, (c) a first terminal adapted to be connected to a positive terminal of a voltage source, (d) a diode having its anode connected to the base of said transistor, (e) a first capacitor connected between the cathode of said diode and the negative side of said voltage source, (f) first circuit means including the primary winding of said transformer connecting the base of said transistor to said first terminal, (g) second circuit means including the secondary winding of said transformer connecting the collector of said transistor to said first terminal, (h) the emitter of said transistor being connected through a load resistor to the negative side of said voltage source, (i) a second capacitor connected to said first terminal and connected in series with the primary winding of said transformer to the base of said transistor, (j) said diode being responsive to a slight rise in voltage of said second capacitor when voltage is applied to said first terminal to conduct and placing said first capacitor in parallel with said second capacitor and causes a delay in the build up of the operating voltage at said transistor base until both of said first and second capacitors are fully charged, (k) said diode being responsive to the equalized potential between said transistor base and said first capacitor to stop conducting and isolate said transistor from said first capacitor when the oscillator begins to oscillate, and (l) an output terminal coupled to the emitter of said transistor.

References Cited

UNITED STATES PATENTS 3,334,619 8/1967 Penn -------------- 331—112

JOHN KOMINSKI, *Primary Examiner.*